US012341196B2

(12) United States Patent
Devi et al.

(10) Patent No.: US 12,341,196 B2
(45) Date of Patent: Jun. 24, 2025

(54) POSITIVE ELECTRODE FOR SECONDARY BATTERY, AND SECONDARY BATTERY

(71) Applicant: MURATA MANUFACTURING CO., LTD., Kyoto (JP)

(72) Inventors: Swati Devi, Kyoto (JP); Yuta Hirano, Kyoto (JP); Shinichi Katayama, Kyoto (JP); Takaaki Matsui, Kyoto (JP); Tomoyo Ooyama, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 589 days.

(21) Appl. No.: 17/734,765

(22) Filed: May 2, 2022

(65) Prior Publication Data
US 2022/0263093 A1  Aug. 18, 2022

Related U.S. Application Data

(63) Continuation of application No. PCT/JP2020/039483, filed on Oct. 21, 2020.

(30) Foreign Application Priority Data

Nov. 7, 2019 (JP) .................. 2019-202626

(51) Int. Cl.
*H01M 4/62* (2006.01)
*H01M 4/131* (2010.01)
(Continued)

(52) U.S. Cl.
CPC .............. *H01M 4/62* (2013.01); *H01M 4/131* (2013.01); *H01M 4/628* (2013.01);
(Continued)

(58) Field of Classification Search
CPC .......... H01M 4/62; H01M 4/131; H01M 4/13; H01M 10/0525
See application file for complete search history.

(56) References Cited

U.S. PATENT DOCUMENTS

2014/0131633 A1  5/2014  Ito et al.
2016/0190595 A1* 6/2016  Takahata .............. H01M 4/485
429/188

(Continued)

FOREIGN PATENT DOCUMENTS

JP  2002252038    9/2002
JP  2002252038 A  9/2002
(Continued)

OTHER PUBLICATIONS

Machine Translation of: Yamazaki et al. (JP 2009/211956), Sep. 17, 2009.*

(Continued)

*Primary Examiner* — Kenneth J Douyette
(74) *Attorney, Agent, or Firm* — K&L Gates LLP

(57) ABSTRACT

A secondary battery includes a positive electrode, a negative electrode, and an electrolytic solution. The positive electrode includes a positive electrode active material layer. The positive electrode active material layer includes N-methyl-2-pyrrolidone. Where the positive electrode active material layer is divided equally in a width direction into two end regions and two middle regions located between the two end regions, a ratio of a content of N-methyl-2-pyrrolidone in the two middle regions to a content of N-methyl-2-pyrrolidone in the two end regions is greater than or equal to 4 and less than or equal to 8.

12 Claims, 4 Drawing Sheets

(51) Int. Cl.
H01M 10/0525 (2010.01)
H01M 10/0567 (2010.01)

(52) U.S. Cl.
CPC ... H01M 10/0525 (2013.01); H01M 10/0567 (2013.01); H01M 2300/0037 (2013.01)

(56) References Cited

U.S. PATENT DOCUMENTS

2017/0317389 A1* 11/2017 Tamaki ............... H01M 50/417
2018/0026314 A1    1/2018 Takahata
2018/0198165 A1*  7/2018 Abe .................. H01M 10/0525

FOREIGN PATENT DOCUMENTS

| JP | 2006269321 |   | 10/2006 |
| JP | 2006269321 | A | 10/2006 |
| JP | 2007165089 | A | 6/2007 |
| JP | 2007519186 | A | 7/2007 |
| JP | 2009211956 | A * | 9/2009 |
| JP | 2009224281 | A | 10/2009 |
| JP | 2012190552 |   | 10/2012 |
| JP | 2012190552 | A | 10/2012 |
| JP | 2013065409 |   | 4/2013 |
| JP | 2016126908 |   | 7/2016 |
| JP | 2016126908 | A | 7/2016 |
| JP | 2017021989 |   | 1/2017 |
| JP | 2017021989 | A | 1/2017 |
| JP | 2018129131 |   | 8/2018 |
| JP | 2018129131 | A | 8/2018 |
| WO | 2005078832 | A1 | 8/2005 |
| WO | 2016010397 |   | 1/2016 |

OTHER PUBLICATIONS

Chinese Office Action issued Nov. 1, 2023 in corresponding Chinese Application No. 202080077402.5.
International Search Report of corresponding PCT application PCT/JP2020/039483, dated Dec. 20, 2020.
European Search Report issued Oct. 1, 2024 in corresponding European Application No. 20884491.0.

* cited by examiner

POSITIVE ELECTRODE FOR SECONDARY BATTERY, AND SECONDARY BATTERY

CROSS REFERENCE TO RELATED APPLICATIONS

The present application is a continuation of PCT/JP2020/039483, filed on Oct. 21, 2020, which claims priority to Japanese patent application no. JP2019-202626, filed on Nov. 7, 2019, the entire contents of which are being incorporated herein by reference.

BACKGROUND

The present technology relates to a positive electrode for a secondary battery, and a secondary battery.

Various kinds of electronic equipment, including mobile phones, have been widely used. Such widespread use has promoted development of a secondary battery as a power source that is smaller in size and lighter in weight and allows for a higher energy density. The secondary battery includes a positive electrode, a negative electrode, and an electrolytic solution. A configuration of the secondary battery has been considered in various ways.

For example, in forming a positive electrode active material layer of a positive electrode by a coating method, an organic solvent (N-methyl-2-pyrrolidone) is used as a solvent for preparation of a solution (a slurry) to be applied. A content of the organic solvent in the positive electrode active material layer is defined to improve durability of a secondary battery.

SUMMARY

Although consideration has been given in various ways to solve problems of a secondary battery, the secondary battery has not yet achieved a sufficient electric resistance characteristic or a sufficient cyclability characteristic, and there is still room for improvement in terms thereof.

The present technology has been made in view of such an issue, and is directed to providing a positive electrode for a secondary battery, and a secondary battery that are each able to achieve a superior electric resistance characteristic and a superior cyclability characteristic according to an embodiment.

A positive electrode for a secondary battery according to an embodiment of the technology includes a positive electrode active material layer. The positive electrode active material layer includes N-methyl-2-pyrrolidone. Where the positive electrode active material layer is divided equally in a width direction into two end regions and two middle regions located between the two end regions, a ratio of a content of N-methyl-2-pyrrolidone in the two middle regions to a content of N-methyl-2-pyrrolidone in the two end regions is greater than or equal to 4 and less than or equal to 8.

A secondary battery according to an embodiment of the present technology includes a positive electrode, a negative electrode, and an electrolytic solution. The positive electrode has a configuration similar to the configuration of the positive electrode for a secondary battery according to an embodiment of the present technology described above.

Here, the "width direction" refers to a direction that is determined by a configuration (a planar shape) of the positive electrode for a secondary battery, or the positive electrode.

For example, in a case where the positive electrode for a secondary battery extends in a predetermined direction (a longitudinal direction), the width direction is a direction (a transverse direction) intersecting the longitudinal direction. In other words, in a case where the planar shape of the positive electrode for a secondary battery is a rectangular shape that is defined by a pair of long sides opposed to each other and a pair of short sides opposed to each other, the width direction is a direction in which the pair of short sides are opposed to each other.

Alternatively, in a case where the planar shape of the positive electrode for a secondary battery is a square shape that is defined by four sides having the same dimension as each other and including one pair of sides opposed to each other and another pair of sides opposed to each other, the width direction may be a direction in which the one pair of sides are opposed to each other, or may be a direction in which the other pair of sides are opposed to each other.

According to the positive electrode for a secondary battery or the secondary battery of an embodiment of the present technology, the positive electrode active material layer (the two end regions and the two middle regions) includes N-methyl-2-pyrrolidone, and the ratio of the content of N-methyl-2-pyrrolidone in the two middle regions to the content of N-methyl-2-pyrrolidone in the two end regions is greater than or equal to 4 and less than or equal to 8. This makes it possible to obtain a superior electric resistance characteristic and a superior cyclability characteristic.

Note that effects of the present technology are not necessarily limited to those described above and may include any of a series of suitable effects including described below in relation to the present technology.

DETAILED DESCRIPTION

One or more embodiments of the present technology are described below in detail with reference to the drawings.

A description is given first of a secondary battery according to an embodiment of the present technology. A positive electrode for a secondary battery according to an embodiment of the technology is a portion or a component of the secondary battery to be described herein, and is thus described together below. Hereinafter, the positive electrode for a secondary battery is simply referred to as a "positive electrode".

The secondary battery described below is a secondary battery that obtains a battery capacity using insertion and extraction of an electrode reactant, and includes a positive electrode, a negative electrode, and an electrolytic solution. The electrolytic solution is a liquid electrolyte. In the secondary battery, to prevent precipitation of the electrode reactant on a surface of the negative electrode during charging, a charge capacity of the negative electrode is greater than a discharge capacity of the positive electrode. In other words, an electrochemical capacity per unit area of the negative electrode is set to be greater than an electrochemical capacity per unit area of the positive electrode.

The electrode reactant is not limited to a particular kind and may be a light metal such as an alkali metal or an alkaline earth metal. Examples of the alkali metal include lithium, sodium, and potassium, and examples of the alkaline earth metal include beryllium, magnesium, and calcium.

In the following, a description is given of an example case where the electrode reactant is lithium. A secondary battery that obtains a battery capacity using insertion and extraction of lithium is a so-called lithium-ion secondary battery. In the lithium-ion secondary battery, lithium is inserted and extracted in an ionic state.

Here, a secondary battery of a laminated-film type is described. The secondary battery of the laminated-film type includes an outer package film 20 having softness or flexibility as an outer package member for containing a battery device.

Figure 1:
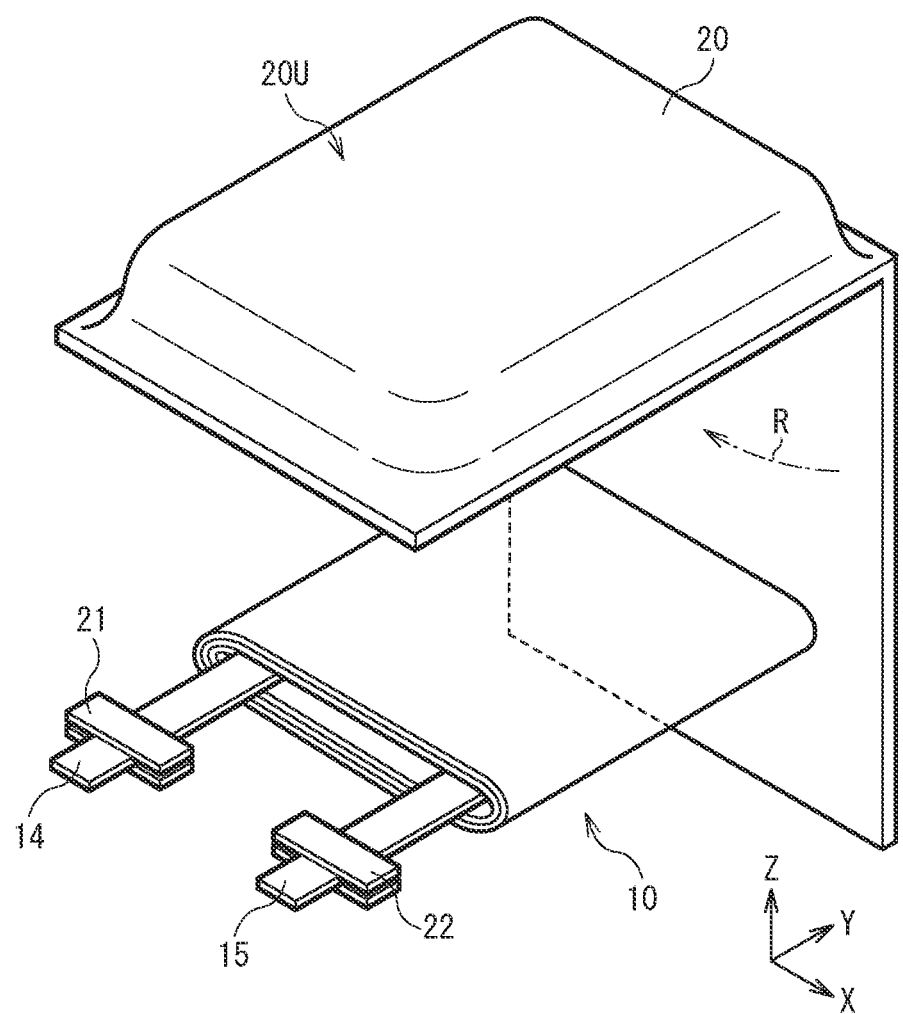
FIG. 1 is a perspective view of a configuration of a secondary battery of a laminated-film type according to an embodiment of the present technology.
Figure 2:
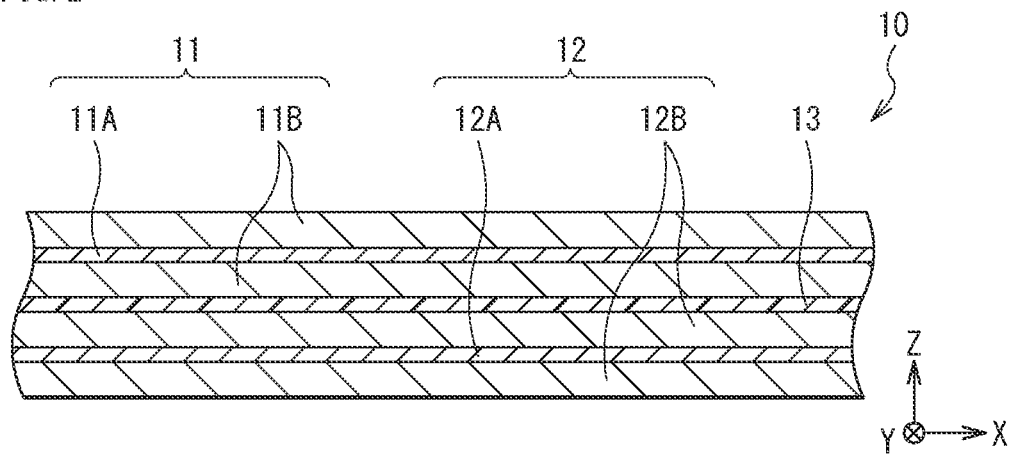
FIG. 2 is a sectional view of a configuration of a wound electrode body illustrated in FIG. 1.
Figure 3:
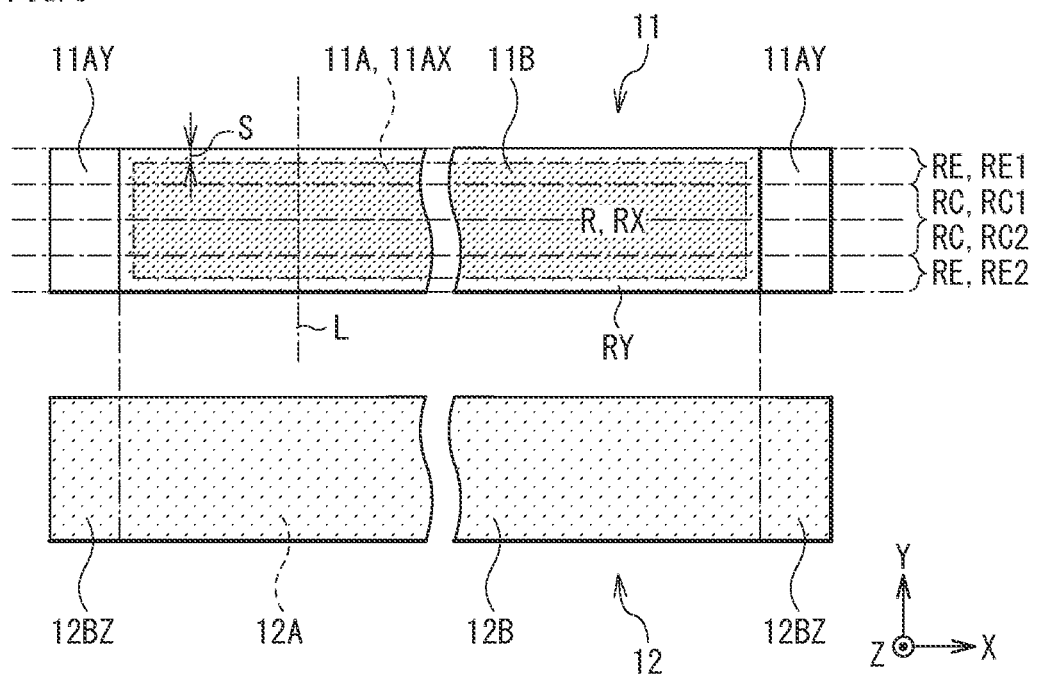
FIG. 3 is a plan view of respective configurations of a positive electrode and a negative electrode illustrated in FIG. 2.

FIG. 1 is a perspective view of a configuration of the secondary battery of the laminated-film type. FIG. 2 illustrates a sectional configuration of a wound electrode body 10 illustrated in FIG. 1. FIG. 3 illustrates respective plan configurations of a positive electrode 11 and a negative electrode 12 illustrated in FIG. 2.

Note that FIG. 1 illustrates a state in which the wound electrode body 10 and the outer package film 20 are separated away from each other. FIG. 2 illustrates only a portion of the wound electrode body 10. FIG. 3 illustrates a state in which the positive electrode 11 and the negative electrode 12 are separated away from each other.

As illustrated in FIG. 1, the secondary battery has the outer package film 20 having a pouch shape in which a wound-type battery device (the wound electrode body 10) is contained. A positive electrode lead 14 and a negative electrode lead 15 are coupled to the wound electrode body 10. The positive electrode lead 14 and the negative electrode lead 15 are each led out from inside the outer package film 20 to outside in a similar direction.

The outer package film 20 is a single film member. The outer package film 20 is foldable in a direction of an arrow R (a dash-dot-dash line) illustrated in FIG. 1. The outer package film 20 has a depression 20U. The depression 20U is a so-called deeply-drawn portion designed to contain the wound electrode body 10.

Specifically, the outer package film 20 is a laminated film including three layers: a fusion-bonding layer, a metal layer, and a surface protective layer that are laminated in this order from an inner side. In a state where the outer package film 20 is folded, outer edges of the fusion-bonding layer are fusion-bonded to each other. The fusion-bonding layer includes a polymer compound such as polypropylene. The metal layer includes a metal material such as aluminum. The surface protective layer includes a polymer compound such as nylon. Note that the number of layers laminated into the outer package film 20 is not limited to three. The outer package film 20 may include one layer, two layers, or four or more layers.

A sealing film 21 is interposed between the outer package film 20 and the positive electrode lead 14, and a sealing film 22 is interposed between the outer package film 20 and the negative electrode lead 15. The sealing films 21 and 22 are members for preventing outside air from entering. The sealing films 21 and 22 include, without limitation, one or more polyolefin resins having adherence to the positive electrode lead 14 and the negative electrode lead 15, respectively. Examples of the polyolefin resin include polyethylene, polypropylene, modified polyethylene, and modified polypropylene. Note that the sealing film 21, the sealing film 22, or both may be omitted.

As illustrated in FIGS. 1 and 2, the wound electrode body 10 includes the positive electrode 11, the negative electrode 12, a separator 13, and an unillustrated electrolytic solution. The wound electrode body 10 has a structure in which the positive electrode 11 and the negative electrode 12 are stacked on each other with the separator 13 interposed therebetween, and the stack of the positive electrode 11, the negative electrode 12, and the separator 13 is wound. The positive electrode 11, the negative electrode 12, and the separator 13 are each impregnated with the electrolytic solution.

As illustrated in FIG. 2, the positive electrode 11 includes a positive electrode current collector 11A, and two positive electrode active material layers 11B provided on respective opposite sides of the positive electrode current collector 11A. However, the positive electrode active material layer 11B may be provided on only one side of the positive electrode current collector 11A.

The positive electrode 11 (the positive electrode active material layer 11B) includes N-methyl-2-pyrrolidone, as will be described later. Hereinafter, N-methyl-2-pyrrolidone is simply referred to as "NMP".

The positive electrode current collector 11A includes one or more of electrically conductive materials including, without limitation, aluminum, nickel, and stainless steel. Specifically, the positive electrode current collector 11A includes, for example, a foil (a metal foil) including the electrically conductive material or metal material described above.

The positive electrode active material layer 11B includes one or more of positive electrode active materials into which lithium is inserted and from which lithium is extracted. The positive electrode active material layer 11B may further include a material such as a positive electrode binder or a positive electrode conductor.

The positive electrode active material is not limited to a particular kind, and is a lithium-containing compound such as a lithium-containing transition metal compound. The lithium-containing transition metal compound includes lithium and one or more of transition metal elements, and may further include one or more of other elements. The other elements may be any elements other than a transition metal element, and are not limited to particular kinds. In particular, the other elements are preferably those belonging to Groups 2 to 15 in the long period periodic table. Note that the lithium-containing transition metal compound may be an oxide or may be any other compound such as a phosphoric acid compound, a silicic acid compound, or a boric acid compound.

Specific examples of the oxide include $LiNiO_2$, $LiCoO_2$, $LiCo_{0.98}Al_{0.01}Mg_{0.01}O_2$, $LiNi_{0.5}Co_{0.2}Mn_{0.3}O_2$, $LiNi_{0.8}Co_{0.15}Al_{0.05}O_2$, $LiNi_{0.33}Co_{0.33}Mn_{0.33}O_2$, $Li_{1.2}Mn_{0.52}Co_{0.175}Ni_{0.1}O_2$, $Li_{1.15}(Mn_{0.65}Ni_{0.22}Co_{0.13})O_2$, and $LiMn_2O_4$. Specific examples of the phosphoric acid compound include $LiFePO_4$, $LiMnPO_4$, $LiFe_{0.5}Mn_{0.5}PO_4$, and $LiFe_{0.3}Mn_{0.7}PO_4$.

The positive electrode binder includes one or more of materials including, without limitation, a synthetic rubber and a polymer compound. Examples of the synthetic rubber include a styrene-butadiene-based rubber, a fluorine-based rubber, and ethylene propylene diene. Examples of the polymer compound include polyvinylidene difluoride, polyimide, and carboxymethyl cellulose.

The positive electrode conductor includes one or more of electrically conductive materials including, without limitation, a carbon material. Examples of the carbon material include graphite, carbon black, acetylene black, and Ketjen black. The positive electrode conductor may be a material such as a metal material or an electrically conductive polymer.

The positive electrode active material layer 11B is provided on a portion of the positive electrode current collector 11A on each of the opposite sides of the positive electrode current collector 11A. Accordingly, a portion of the positive electrode current collector 11A on which the positive electrode active material layer 11B is not provided is exposed without being covered with the positive electrode active material layer 11B.

Specifically, the positive electrode current collector 11A extends in a longitudinal direction (X-axis direction) as illustrated in FIG. 3, and includes a covered portion 11AX and paired uncovered portions 11AY. The covered portion 11AX is a portion which is located at the middle portion of the positive electrode current collector 11A in the longitudinal direction and on which the positive electrode active material layer 11B is formed. The paired uncovered portions 11AY are portions which are located at respective ends of the positive electrode current collector 11A in the longitudinal direction and on which the positive electrode active material layer 11B is not formed. Accordingly, the covered portion 11AX is covered with the positive electrode active material layer 11B, whereas the paired uncovered portions 11AY are exposed without being covered with the positive electrode active material layer 11B. In FIG. 3, the positive electrode active material layer 11B (a formation region R to be described later) is slightly shaded.

As illustrated in FIG. 2, the negative electrode 12 includes a negative electrode current collector 12A, and two negative electrode active material layers 12B provided on respective opposite sides of the negative electrode current collector 12A. However, the negative electrode active material layer 12B may be provided only on one side of the negative electrode current collector 12A.

The negative electrode current collector 12A includes one or more of electrically conductive materials including, without limitation, copper, aluminum, nickel, and stainless steel. Specifically, the negative electrode current collector 12A includes, for example, a metal foil including the electrically conductive material or metal material described above.

The negative electrode active material layer 12B includes one or more of negative electrode active materials into which lithium is inserted and from which lithium is extracted. The negative electrode active material layer 12B may further include a material such as a negative electrode binder or a negative electrode conductor. Details of the negative electrode binder and the negative electrode conductor are similar to details of the positive electrode binder and the positive electrode conductor, respectively.

The negative electrode active material is not limited to a particular kind, and examples thereof include a carbon material and a metal-based material. Examples of the carbon material include graphitizable carbon, non-graphitizable carbon, and graphite. The metal-based material is a material including a metal element or a metalloid element that is able to form an alloy with lithium. More specifically, the metal-based material is, for example, silicon or tin. The metal-based material may be a simple substance, an alloy, a compound, or a mixture of two or more thereof.

Specific examples of the metal-based material include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, $SiC$, $Si_3N_4$, $Si_2N_2O$, $SiO_v$ ($0<v\leq2$ or $0.2<v<1.4$), $LiSiO$, $SnO_w$ ($0<w\leq2$), $SnSiO_3$, $LiSnO$, and $Mg_2Sn$.

A method of forming the negative electrode active material layer 12B is not limited to a particular method, and includes one or more of methods including, without limitation, a coating method, a vapor-phase method, a liquid-phase method, a thermal spraying method, and a firing (sintering) method.

The negative electrode active material layer 12B is provided on the entire negative electrode current collector 12A on each of the opposite sides of the negative electrode current collector 12A. Accordingly, the negative electrode current collector 12A is entirely covered with the negative electrode active material layer 12B without being exposed.

Specifically, as illustrated in FIG. 3, the negative electrode current collector 12A extends in the longitudinal direction (X-axis direction), and the negative electrode active material layer 12B includes paired non-opposed portions 12BZ. The paired non-opposed portions 12BZ are opposed to the paired uncovered portions 11AY. That is, the paired non-opposed portions 12BZ are not opposed to the positive electrode active material layer 11B and thus do not contribute to charging and discharging reactions. In FIG. 3, the negative electrode active material layer 12B is slightly shaded.

The negative electrode active material layer 12B is entirely provided on each of the opposite sides of the negative electrode current collector 12A, whereas the positive electrode active material layer 11B is provided on only a portion (the covered portion 11AX) of each of the opposite sides of the positive electrode current collector 11A, in order to prevent lithium extracted from the positive electrode active material layer 11B at the time of charging from precipitating on the surface of the negative electrode 12.

As illustrated in FIG. 2, the separator 13 is interposed between the positive electrode 11 and the negative electrode 12. The separator 13 is an insulating porous film that allows lithium to pass therethrough while preventing a short circuit caused by contact between the positive electrode 11 and the negative electrode 12. The separator 13 may be a single-layer film including one porous film of one kind, or may be a multi-layer film including two or more porous films of one or more kinds that are stacked on each other. The porous film includes one or more of polymer compounds including, without limitation, polytetrafluoroethylene, polypropylene, and polyethylene.

The electrolytic solution includes a solvent and an electrolyte salt. Only one solvent may be used, or two or more solvents may be used. In addition, only one electrolyte salt may be used, or two or more electrolyte salts may be used.

The solvent includes a non-aqueous solvent (an organic solvent), and the electrolytic solution including the non-aqueous solvent is a so-called non-aqueous electrolytic solution. Examples of the non-aqueous solvent include esters and ethers. More specifically, examples of the non-aqueous solvent include a carbonic-acid-ester-based compound, a carboxylic-acid-ester-based compound, and a lactone-based compound.

Examples of the carbonic-acid-ester-based compound include a cyclic carbonic acid ester and a chain carbonic acid ester. Examples of the cyclic carbonic acid ester include ethylene carbonate and propylene carbonate. Examples of the chain carbonic acid ester include dimethyl carbonate, diethyl carbonate, and methyl ethyl carbonate. Examples of the carboxylic-acid-ester-based compound include ethyl acetate, ethyl propionate, and ethyl trimethylacetate. Examples of the lactone-based compound include γ-butyrolactone and γ-valerolactone. Examples of the ethers other than the lactone-based compounds described above include 1,2-dimethoxy ethane, tetrahydrofuran, 1,3-dioxolane, and 1,4-dioxane.

Examples of the non-aqueous solvent further include an unsaturated cyclic carbonic acid ester, a halogenated carbonic acid ester, a sulfonic acid ester, a phosphoric acid ester, an acid anhydride, a nitrile compound, and an isocyanate compound. A reason for this is that chemical stability of the electrolytic solution improves.

Specifically, the term "unsaturated cyclic carbonic acid ester" is a generic term for a cyclic carbonic acid ester including one or more unsaturated bonds (carbon-carbon double bonds). Examples of the unsaturated cyclic carbonic acid ester include vinylene carbonate, vinylethylene carbonate, and methylene ethylene carbonate. The term "halogenated carbonic acid ester" is a generic term for a carbonic acid ester including one or more halogens as a constituent element or constituent elements. Examples of the halogenated carbonic acid ester include monofluoroethylene carbonate and difluoroethylene carbonate. Examples of the sulfonic acid ester include 1,3-propane sultone and 1,3-propene sultone. Examples of the phosphoric acid ester include trimethyl phosphate.

Examples of the acid anhydride include a cyclic carboxylic acid anhydride, a cyclic disulfonic acid anhydride, and a cyclic carboxylic acid sulfonic acid anhydride. Examples of the cyclic carboxylic acid anhydride include a succinic acid anhydride, a glutaric acid anhydride, and a maleic acid anhydride. Examples of the cyclic disulfonic acid anhydride include an ethane disulfonic acid anhydride and a propane disulfonic acid anhydride. Examples of the cyclic carboxylic acid sulfonic acid anhydride include a sulfobenzoic acid anhydride, a sulfopropionic acid anhydride, and a sulfobutyric acid anhydride.

The term "nitrile compound" is a generic term for a compound including one or more cyano groups (—CN). Examples of the nitrile compound include acetonitrile, acrylonitrile, malononitrile, succinonitrile, glutaronitrile, adiponitrile, sebaconitrile, and phthalonitrile. The term "isocyanate compound" is a generic term for a compound including one or more isocyanate groups (—NCO). Examples of the isocyanate compound include hexamethylene diisocyanate.

In particular, the electrolytic solution preferably includes the nitrile compound, and further preferably includes both succinonitrile and adiponitrile. A reason for this is that the chemical stability of the electrolytic solution further improves, while an increase in electric resistance of the secondary battery is suppressed by optimization of a concentration ratio C, as will be described later. A content of the nitrile compound in the electrolytic solution is not limited to a particular content; however, in particular, the content is preferably from 3 wt % to 8 wt % both inclusive. A reason for this is that the chemical stability of the electrolytic solution improves sufficiently.

The electrolyte salt includes one or more of light metal salts including, without limitation, a lithium salt. Examples of the lithium salt include lithium hexafluorophosphate ($LiPF_6$), lithium tetrafluoroborate ($LiBF_4$), lithium trifluoromethanesulfonate ($LiCF_3SO_3$), lithium bis(fluorosulfonyl)imide ($LiN(FSO_2)_2$), lithium bis(trifluoromethanesulfonyl)imide ($LiN(CF_3SO_2)_2$), lithium tris(trifluoromethanesulfonyl)methide ($LiC(CF_3SO_2)_3$), and lithium bis(oxalato)borate ($LiB(C_2O_4)_2$). The content of the electrolyte salt is not limited to a particular content; however, the content is from 0.3 mol/kg to 3.0 mol/kg both inclusive with respect to the solvent. A reason for this is that high ion conductivity is obtainable.

The positive electrode lead 14 is coupled to the positive electrode 11 (the positive electrode current collector 11A), and the negative electrode lead 15 is coupled to the negative electrode 12 (the negative electrode current collector 12A). The positive electrode lead 14 includes one or more of electrically conductive materials including, without limitation, aluminum, and the negative electrode lead 15 includes one or more of electrically conductive materials including, without limitation, copper, nickel, and stainless steel. The positive electrode lead 14 and the negative electrode lead 15 each have a shape such as a thin plate shape or a meshed shape.

In the secondary battery, a predetermined physical property condition is satisfied regarding a state in which NMP is contained (distribution of NMP) in the positive electrode 11, as described below.

Specifically, as illustrated in FIG. 3, the positive electrode active material layer 11B extends in the longitudinal direction (X-axis direction), as with the positive electrode current collector 11A. Accordingly, the positive electrode active material layer 11B has a length, which is a dimension in the longitudinal direction, and a width, which is a dimension in a transverse direction (Y-axis direction).

Dividing the positive electrode active material layer 11B equally into four parts in a width direction allows the positive electrode active material layer 11B to be divided into two end regions RE (RE1 and RE2) and two middle regions RC (RC1 and RC2). In other words, the end region RE1, the middle region RC1, the middle region RC2, and the end region RE2 have the same width as each other. In FIG. 3, the end region RE1 is located above the end region RE2, and the middle regions RC1 and RC2 are located between the end regions RE1 and RE2. The middle region RC1 is located above the middle region RC2.

Here, the "width direction" refers to a direction that is determined by a configuration (a planar shape) of the positive electrode 11, as described above. Specifically, in a case where the positive electrode 11 extends in the longitudinal direction (X-axis direction), the width direction is the transverse direction (Y-axis direction) intersecting the longitudinal direction. In other words, in a case where the planar shape of the positive electrode 11 is a rectangular shape that is defined by a pair of long sides opposed to each other and a pair of short sides opposed to each other, the width direction is a direction in which the pair of short sides are opposed to each other.

In this case, a ratio (the concentration ratio C) of a content or concentration of NMP in the middle regions RC1 and RC2 to a content or concentration of NMP in the end regions RE1 and RE2 is from 4 to 8 both inclusive. The concentration ratio C is represented by the following expression: concentration of NMP in middle regions RC1 and RC2/concentration of NMP in end regions RE1 and RE2.

The above-described condition regarding the concentration ratio C (an optimized range of the concentration ratio C) is satisfied for the following reason. The distribution of NMP in the positive electrode active material layer 11B, i.e., a relationship between the concentration of NMP in the end regions RE1 and RE2 and the concentration of NMP in the middle regions RC1 and RC2, is optimized, which improves electron conductivity of the positive electrode 11. This results in a decrease in electric resistance of the positive electrode 11, in particular, the electric resistance of the positive electrode 11 in an initial stage of use of the secondary battery. This also helps to prevent the discharge capacity from decreasing even upon repeated charging and discharging of the secondary battery. Note that details of the reason why the physical property condition is satisfied will be described later.

In particular, the concentration ratio C is preferably from 4 to 6 both inclusive. A reason for this is that this further improves the electron conductivity of the positive electrode 11, which results in a further decrease in the electric resistance of the positive electrode 11, and helps to further prevent the discharge capacity from decreasing even upon repeated charging and discharging of the secondary battery. In particular, this helps to prevent the electron conductivity of the positive electrode 11 from decreasing even upon repeated charging and discharging of the secondary battery, which helps to prevent an increase in the electric resistance of the positive electrode 11.

A method of adjusting the concentration ratio C is not limited to a particular method. As an example method, the concentration ratio C may be adjusted to a desired value by changing a content of NMP in a positive electrode mixture slurry in a process of fabricating the positive electrode 11 (in preparing the positive electrode mixture slurry), as will be described later. In other words, depending on the content of NMP in the positive electrode mixture slurry, the concentration of NMP in the two end regions RE changes and the concentration of NMP in the two middle regions RC changes, which results in a change in the concentration ratio C. Specifically, an increase in the content of NMP in the positive electrode mixture slurry results in an increase in the concentration ratio C, and a decrease in the content of NMP in the positive electrode mixture slurry results in a decrease in the concentration ratio C.

To obtain the concentration ratio C, the positive electrode 11 is analyzed by time-of-flight secondary ion mass spectrometry (TOF-SIMS), as described below.

Specifically, each of the two end regions RE (RE1 and RE2) and the two middle regions RC (RC1 and RC2) is analyzed by TOF-SIMS. Thus, a peak PRE attributed to NMP is detected in the two end regions RE, and a peak PRC attributed to NMP is detected in the two middle regions RC.

Intensity of the peak PRE is an index indicating the content of NMP in each of the two end regions RE, and increases or decreases depending on whether the concentration of NMP is high or low. The peak PRC is an index indicating the content of NMP in the two middle regions RC, and increases or decreases depending on whether the concentration of NMP is high or low. Note that, in a case of analyzing the two end regions RE to detect the peak PRE, only the end region RE1 may be analyzed, only the end region RE2 may be analyzed, or both the end regions RE1 and RE2 may be analyzed. Similarly, in a case of analyzing the two middle regions RC to detect the peak PRC, only the middle region RC1 may be analyzed, only the middle region RC2 may be analyzed, or both the middle regions RC1 and RC2 may be analyzed.

In this case, a ratio of the intensity of the peak PRC to the intensity of the peak PRE (peak intensity ratio T=intensity of peak PRC/intensity of peak PRE) is from 4 to 8 both inclusive, preferably from 4 to 6 both inclusive, because the peak intensity ratio T corresponds to the concentration ratio C as described above.

A content of NMP in the positive electrode active material layer 11B is not limited to a particular content, as long as the above-described condition regarding the concentration ratio C (the condition regarding the peak intensity ratio T) is satisfied. In particular, the content of NMP is from 65 µl/m$^2$ (=65 mm$^3$/m$^2$) to 125 µl/m$^2$ (=125 mm$^3$/m$^2$) both inclusive. A reason for this is that this results in a stable decrease in the electric resistance of the positive electrode 11, and helps to stably prevent the discharge capacity from decreasing even upon repeated charging and discharging of the secondary battery. The content of NMP described here is the content of NMP in the entire positive electrode active material layer 11B including the end regions RE1 and RE2 and the middle regions RC1 and RC2.

In a case of measuring the content of NMP in the positive electrode active material layer 11B, the positive electrode active material layer 11B is analyzed by means of a gas chromatograph-mass spectrometer (GC-MS). For example, a GC/MS system Agilent 5977A manufactured by Agilent Technologies, Inc. may be used as the GC-MS. In this case, the content of NMP is measured in each of four places, i.e., the end regions RE1 and RE2 and the middle regions RC1 and RC2, following which an average value of the contents of NMP in the four places is calculated, to thereby obtain the above-described content of NMP in the entire positive electrode active material layer 11B.

[Method of Calculating Concentration Ratio (Method of Calculating Peak Intensity Ratio)]

A specific procedure for calculating the peak intensity ratio T to calculate the concentration ratio C is as described below.

First, processes including the process of fabricating the positive electrode 11 and a process of fabricating the wound electrode body 10 by impregnation with the electrolytic solution are performed to thereby assemble the secondary battery, following which the secondary battery is charged and discharged for one cycle. This charging and discharging treatment is a secondary battery stabilization or activation treatment that is performed to form a so-called solid electrolyte interphase (SEI) film on the surface of the negative electrode 12. Details (including charging and discharging conditions) of the secondary battery stabilization treatment will be described later.

Note that the secondary battery stabilization treatment described above is unnecessary in a case of using a commercially available secondary battery. A reason for this is that, in general, a commercially available secondary battery has been already subjected to the secondary battery stabilization treatment in manufacture before being shipped to the market.

Thereafter, the secondary battery is disassembled to thereby collect the positive electrode 11. Thus, the positive electrode active material layer 11B including the two end regions RE (RE1 and RE2) and the two middle regions RC (RC1 and RC2) is obtained as illustrated in FIG. 3.

Thereafter, the positive electrode 11 (the positive electrode active material layer 11B) is analyzed by TOF-SIMS to thereby detect the peaks PRE and PRC attributed to NMP. In this case, one or both of the end regions RE1 and RE2 are analyzed to thereby detect the peak PRE, and one or both of the middle regions RC1 and RC2 are analyzed to thereby detect the peak PRC.

In the analysis of the positive electrode active material layer 11B based on TOF-SIMS, it is examined whether a peak of a positive secondary ion (a TOF-SIMS peak) attributed to the presence of NMP is detected. The positive secondary ion is $C_5H_8NO^+$, $C_5H_{10}NO^+$, or both. In this case, TOF-SIMS V manufactured by IONTOF is used as a spectrometer. Analysis conditions are as follows: a primary ion is $Bi^{3+}$ ($9.7952\times10^{11}$ ions/cm$^2$), an ion gun acceleration voltage is 25 keV, an analysis mode is a bunching mode, an applied ion current (measured in the form of a pulse beam) is 0.3 pA, a pulse frequency is 10 kHz, a mass range is a range of 1 amu to 800 amu, a scan range is 200 μm×200 μm, and mass resolution M/ΔM is 6800 ($C_2H_5^+$) and 5900 ($CH_2^-$).

Here, in a case of analyzing the positive electrode active material layer 11B by TOF-SIMS, the inside of an analysis region RX is analyzed. As illustrated in FIG. 3, the analysis range RX is a region obtained by excluding an outer peripheral region RY from the formation region R of the positive electrode active material layer 11B. The formation region RX described here is the entire region of the positive electrode active material layer 11B. The outer peripheral region RY is a region between a position of an outer edge of the positive electrode active material layer 11B and a position at a distance S (mm) inward from the outer edge. The outer peripheral region RY is a so-called frame-shaped region. The distance S may be set to any distance in accordance with, for example, stability (a degree of variation) of values in a case where the peak intensity ratio T is repeatedly calculated multiple times, i.e., calculation accuracy of the peak intensity ratio T. Specifically, the distance S is about 1 mm to about 5 mm. In FIG. 3, the analysis region RX is darkly shaded.

A reason for analyzing the positive electrode active material layer 11B inside the analysis region RX is to accurately and stably calculate the peak intensity ratio T by ensuring measurement accuracy of the intensity of each of the peaks PRE and PRC.

In a case of analyzing the positive electrode active material layer 11B by TOF-SIMS, the analysis is performed at multiple positions, inside the analysis region RX, located along an analysis line L illustrated in FIG. 3. The analysis line L is a reference line extending in the width direction (Y-axis direction), and is used to determine analysis positions of the positive electrode active material layer 11B. The position of the analysis line L may be set to any position, as long as the analysis line L traverses the analysis region RX.

Specifically, in a case of analyzing the positive electrode active material layer 11B in the two end regions RE, the analysis is performed at five positions different from each other and located along the analysis line L. Although not particularly limited, the five analysis positions are preferably positions appropriately spaced from each other. As long as the number of analysis positions is five, the number of analysis positions in each of the end regions RE1 and RE2 may be set freely.

Similarly, in a case of analyzing the positive electrode active material layer 11B in the two middle regions RC, the analysis is performed at five positions different from each other and located along the analysis line L. Although not particularly limited, the five analysis positions are preferably positions appropriately spaced from each other.

Note that, in a case of analyzing the positive electrode active material layer 11B by TOF-SIMS, the positive electrode 11 may be analyzed. In other words, in a case where the positive electrode 11 includes the positive electrode current collector 11A together with the positive electrode active material layer 11B, it is unnecessary to analyze the positive electrode active material layer 11B after the positive electrode active material layer 11B is peeled from the positive electrode current collector 11A. The positive electrode active material layer 11B may be analyzed in a state in which the positive electrode active material layer 11B is provided on the positive electrode current collector 11A.

A reason for this is that the positive electrode active material layer 11B is impregnated with NMP, whereas the positive electrode current collector 11A is hardly impregnated with NMP, because the positive electrode current collector 11A is, for example, a metal foil, as described above. The presence or absence of the positive electrode current collector 11A thus hardly influences an analysis result of the positive electrode active material layer 11B based on TOF-SIMS. Accordingly, the positive electrode active material layer 11B may be analyzed in the state in which the positive electrode active material layer 11B is provided on the positive electrode current collector 11A.

Thereafter, the intensity of each of the peaks PRE and PRC attributed to NMP is measured on the basis of the analysis result of the positive electrode active material layer 11B based on TOF-SIMS. In this case, an average value of intensities of the peak PRE measured at the five positions in the two end regions RE is calculated to thereby obtain the intensity of the peak PRE. In addition, an average value of intensities of the peak PRC measured at the five positions in the two middle regions RC is calculated to thereby obtain the intensity of the peak PRC. In other words, the intensity of each of the peaks PRE and PRC is so-called average intensity.

A reason for using the average value to measure the intensity of each of the peaks PRE and PRC is to reduce an influence that variation in the concentration of NMP in each of the two end regions RE and the two middle regions RC exerts on the intensity of each of the peaks PRE and PRC.

Lastly, peak intensity ratio T=intensity of peak PRC/intensity of peak PRE is calculated on the basis of the intensity of each of the peaks PRE and PRC. Thus, the peak intensity ratio T is obtained, and accordingly the concentration ratio C corresponding to the peak intensity ratio T is obtained.

The secondary battery operates as follows. Upon charging the secondary battery, lithium is extracted from the positive electrode 11, and the extracted lithium is inserted into the negative electrode 12 via the electrolytic solution. In contrast, upon discharging the secondary battery, lithium is extracted from the negative electrode 12, and the extracted lithium is inserted into the positive electrode 11 via the electrolytic solution. Upon charging and discharging the secondary battery, lithium is inserted and extracted in an ionic state.

In a case of manufacturing the secondary battery, the positive electrode 11 and the negative electrode 12 are fabricated and the electrolytic solution is prepared, following which the secondary battery is assembled according to a procedure described below.

First, the positive electrode active material is mixed with, on an as-needed basis, a material such as the positive electrode binder or the positive electrode conductor to thereby obtain a positive electrode mixture. Thereafter, the positive electrode mixture is put into NMP to thereby prepare a paste positive electrode mixture slurry. Thereafter, the positive electrode mixture slurry is applied on each of the opposite sides of the positive electrode current collector 11A to thereby form the positive electrode active material layer 11B. Lastly, the positive electrode active material layer 11B is heated in a vacuum environment to thereby vacuum-dry the positive electrode active material layer 11B.

Thereafter, the positive electrode active material layer 11B may be compression-molded by means of a machine such as a roll pressing machine. In this case, the positive electrode active material layer 11B may be heated. The positive electrode active material layer 11B may be compression-molded multiple times. The positive electrode active material layer 11B is thus formed on each of the opposite sides of the positive electrode current collector 11A. As a result, the positive electrode 11 is fabricated.

The negative electrode active material layer 12B is formed on each of the opposite sides of the negative electrode current collector 12A by a procedure similar to the fabrication procedure of the positive electrode 11 described above. Specifically, the negative electrode active material is mixed with, on an as-needed basis, a material such as the negative electrode binder or the negative electrode conductor to thereby obtain a negative electrode mixture. Thereafter, the negative electrode mixture is put into a solvent such as an organic solvent to thereby prepare a paste negative electrode mixture slurry. Thereafter, the negative electrode mixture slurry is applied on each of the opposite sides of the negative electrode current collector 12A to thereby form the negative electrode active material layer 12B. Thereafter, the negative electrode active material layer 12B may be compression-molded. The negative electrode active material layer 12B is thus formed on each of the opposite sides of the negative electrode current collector 12A. As a result, the negative electrode 12 is fabricated.

The electrolyte salt is put into the solvent. This allows the electrolyte salt to be dispersed or dissolved into the solvent. As a result, the electrolytic solution is prepared.

First, the positive electrode lead 14 is coupled to the positive electrode 11 (the positive electrode current collector 11A) by a method such as a welding method, and the negative electrode lead 15 is coupled to the negative electrode 12 (the negative electrode current collector 12A) by a method such as a welding method. Thereafter, the positive electrode 11 and the negative electrode 12 are stacked on each other with the separator 13 interposed therebetween, following which the stack of the positive electrode 11, the negative electrode 12, and the separator 13 is wound to thereby fabricate a wound body.

Thereafter, the outer package film 20 is folded in a state in which the wound body is contained inside the depression 20U, following which outer edges of two sides of the outer package film 20 (the fusion-bonding layer) are bonded to each other by a method such as a thermal fusion bonding method. Thus, the wound body is placed into the pouch-shaped outer package film 20. Lastly, the electrolytic solution is injected into the pouch-shaped outer package film 20, following which the outer edges of the remaining one side of the outer package film 20 (the fusion-bonding layer) are bonded with each other by a method such as a thermal fusion bonding method. In this case, the sealing film 21 is disposed between the outer package film 20 and the positive electrode lead 14, and the sealing film 22 is disposed between the outer package film 20 and the negative electrode lead 15. The wound body is thereby impregnated with the electrolytic solution. Thus, the wound electrode body 10 is fabricated. Accordingly, the wound electrode body 10 is sealed in the pouch-shaped outer package film 20. As a result, the secondary battery is assembled.

Lastly, the secondary battery is charged and discharged in order to stabilize a state of the secondary battery. Various conditions including, for example, an environmental temperature, the number of times of charging and discharging (the number of cycles), and the charging and discharging conditions may be set freely. The charging and discharging of the secondary battery causes an SEI film to be formed on the surface of, for example, the negative electrode 12. As a result, the secondary battery of the laminated-film type is completed.

According to the secondary battery of the laminated-film type, the positive electrode active material layer 11B of the positive electrode 11 includes NMP, and the concentration ratio C is from 4 to 8 both inclusive.

In this case, the state in which NMP is contained (the distribution of NMP) in the positive electrode active material layer 11B, i.e., the relationship between the concentration of NMP in the two end regions RE (RE1 and RE2) and the concentration of NMP in the two middle regions RC (RC1 and RC2), is optimized, which improves the electron conductivity of the positive electrode 11. This results in a decrease in the electric resistance of the positive electrode 11, in particular, the electric resistance of the positive electrode 11 in the initial stage of use of the secondary battery, and helps to prevent the discharge capacity from decreasing even upon repeated charging and discharging. This makes it possible to obtain a superior electric resistance characteristic and a superior cyclability characteristic.

In particular, the concentration ratio C may be from 4 to 6 both inclusive. This results in a further decrease in the electric resistance of the positive electrode 11, and helps to further prevent the discharge capacity from decreasing even upon repeated charging and discharging of the secondary battery. Accordingly, it is possible to achieve higher effects.

The content of NMP in the positive electrode active material layer 11B may be from 65 $mm^3/m^2$ to 125 $mm^3/m^2$ both inclusive. This results in a stable decrease in the electric resistance of the positive electrode 11, and helps to stably prevent a decrease in discharge capacity. Accordingly, it is possible to achieve higher effects.

The electrolytic solution may include a nitrile compound, and the nitrile compound may include any of the materials including, without limitation, acetonitrile. This further improves the chemical stability of the electrolytic solution, while an increase in the electric resistance of the secondary battery is suppressed by the optimization of the concentration ratio C described above. Accordingly, it is possible to achieve higher effects. In this case, the nitrile compound may include succinonitrile and adiponitrile. This sufficiently improves the chemical stability of the electrolytic solution, making it possible to achieve even higher effects. Further, the content of the nitrile compound in the electrolytic solution may be from 3 wt % to 8 wt % both inclusive. This sufficiently improves the chemical stability of the electrolytic solution, making it possible to achieve even higher effects.

Further, the secondary battery may be a lithium-ion secondary battery. This makes it possible to obtain a sufficient battery capacity stably through the use of insertion and extraction of lithium. Accordingly, it is possible to achieve higher effects.

Other than the above, according to the positive electrode 11 that is used for the secondary battery of the laminated-film type, the positive electrode active material layer 11B includes NMP, and the concentration ratio C is from 4 to 8 both inclusive. Accordingly, for the reasons described above, it is possible for the secondary battery including the positive electrode 11 to achieve a superior electric resistance characteristic and a superior cyclability characteristic.

Next, a description is given of modifications of the secondary battery described above according to an embodiment. The configuration of the secondary battery may be changed as appropriate as described below. However, any two or more of the modifications described in sequence below may be combined to each other.

To optimize the concentration ratio C (the concentration ratio C of from 4 to 8 both inclusive), the content of NMP in the positive electrode mixture slurry is changed. However, the method of optimizing the concentration ratio C is not particularly limited, and may be another method.

Specifically, after the fabrication of the positive electrode 11, NMP may be applied on a surface of the positive electrode 11 (the positive electrode active material layer 11B). Examples of the application include spraying. In this case, an amount of NMP applied is adjusted to make the concentration of NMP in the middle regions RC1 and RC2 higher than the concentration of NMP in the end regions RE1 and RE2. This makes it possible to control the concentration ratio C.

In this case also, the concentration ratio C is optimized. Accordingly, it is possible to achieve similar effects. Needless to say, two or more methods may be used in combination to optimize the concentration ratio C.

The battery device of the wound type (the wound electrode body 10) is used in FIGS. 1 and 2. However, a battery device of a stacked type (a stacked electrode body 50) may be used instead of the wound electrode body 10, as illustrated in FIG. 4 corresponding to FIG. 1, and FIG. 5 corresponding to FIG. 2.

Figure 4:
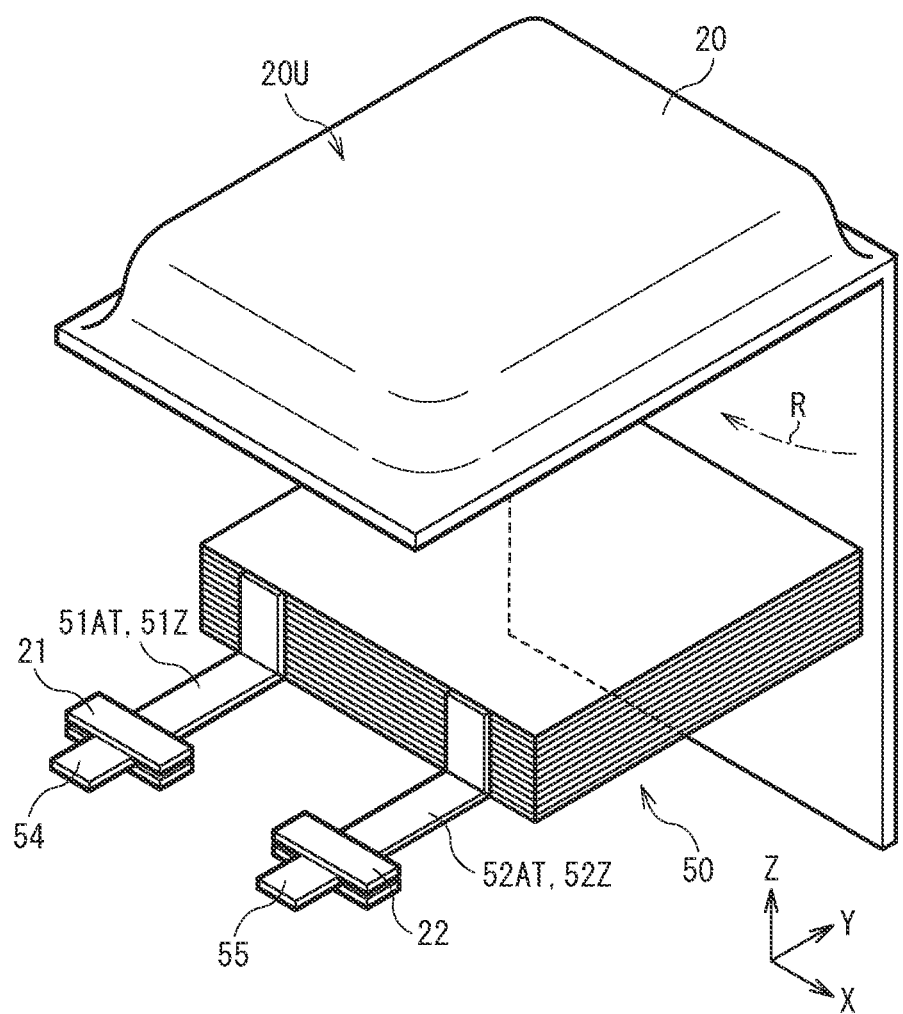
FIG. 4 is a perspective view of a configuration of a secondary battery including a stacked electrode body according to a modification according to an embodiment.
Figure 5:
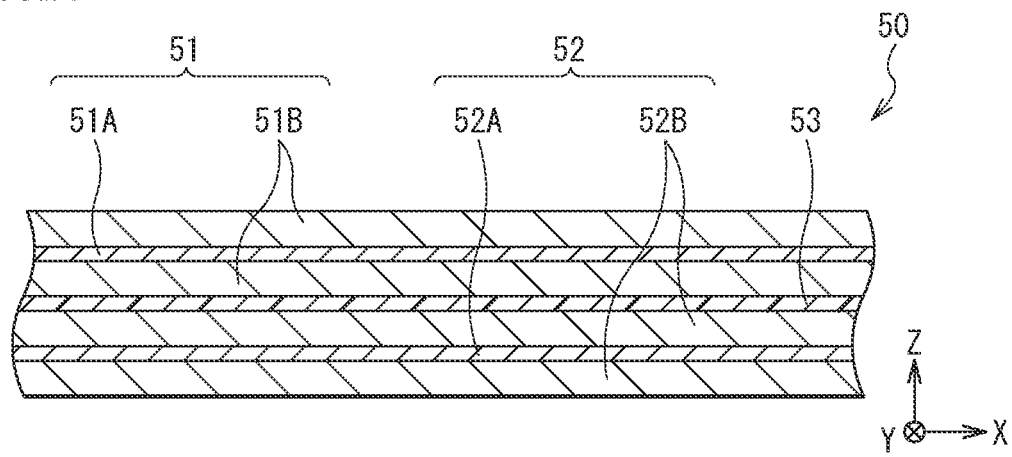
FIG. 5 is a sectional view of a configuration of the stacked electrode body illustrated in FIG. 4.

The secondary battery of the laminated-film type illustrated in FIGS. 4 and 5 has a configuration similar to that of the secondary battery of the laminated-film type illustrated in FIGS. 1 and 2 except that the stacked electrode body 50 (a positive electrode 51, a negative electrode 52, and a separator 53), a positive electrode lead 54, and a negative electrode lead 55 are included instead of the wound electrode body 10 (the positive electrode 11, the negative electrode 12, and the separator 13), the positive electrode lead 14, and the negative electrode lead 15.

The positive electrode 51 (a positive electrode current collector 51A and a positive electrode active material layer 51B), the negative electrode 52 (a negative electrode current collector 52A and a negative electrode active material layer 52B), the separator 53, the positive electrode lead 54, and the negative electrode lead 55 have configurations similar to the configurations of the positive electrode 11 (the positive electrode current collector 11A and the positive electrode active material layer 11B), the negative electrode 12 (the negative electrode current collector 12A and the negative electrode active material layer 12B), the separator 13, the positive electrode lead 14, and the negative electrode lead 15, respectively, except the following points.

Note that, in a case where the planar shape of the positive electrode 51 is a square shape that is defined by four sides having the same dimension as each other and including one pair of sides opposed to each other and another pair of sides opposed to each other, the width direction may be the direction (X-axis direction) in which the one pair of sides are opposed to each other, or may be the direction (Y-axis direction) in which the other pair of sides are opposed to each other, as described above.

In the stacked electrode body 50, the positive electrode 51 and the negative electrode 52 are alternately stacked on each other with the separator 53 interposed therebetween. The respective numbers of the positive electrodes 51, the negative electrodes 52, and the separators 53 to be stacked are not limited to a particular number. Here, the multiple positive electrodes 51 and the multiple negative electrodes 52 are alternately stacked on each other with the multiple separators 53 interposed therebetween. The positive electrodes 51, the negative electrodes 52, and the separators 53 are each impregnated with the electrolytic solution having the configuration described above. The positive electrode 51 includes the positive electrode current collector 51A and the positive electrode active material layer 51B. The negative electrode 52 includes the negative electrode current collector 52A and the negative electrode active material layer 52B.

As illustrated in FIGS. 4 and 5, each of the multiple positive electrode current collectors 51A includes a projecting part 51AT on which the positive electrode active material layer 51B is not formed, and each of the multiple negative electrode current collectors 52A includes a projecting part 52AT on which the negative electrode active material layer 52B is not formed. The projecting part 52AT is disposed at a position not overlapping the projecting part 51AT. The multiple projecting parts 51AT are joined to each other to form a single joint part 51Z having a lead shape. The multiple projecting parts 52AT are joined to each other to form a single joint part 52Z having a lead shape. The positive electrode lead 54 is coupled to the joint part 51Z, and the negative electrode lead 55 is coupled to the joint part 52Z.

A manufacturing method of the secondary battery of the laminated-film type illustrated in FIGS. 4 and 5 is similar to the manufacturing method of the secondary battery of the laminated-film type illustrated in FIGS. 1 and 2 except that the stacked electrode body 50 (the positive electrode lead 54 and the negative electrode lead 55) is fabricated instead of the wound electrode body 10 (the positive electrode lead 14 and the negative electrode lead 15).

In a case of fabricating the stacked electrode body 50, first, the positive electrode 51 including the positive electrode active material layer 51B formed on each of opposite sides of the positive electrode current collector MA (except the projecting part 51AT) and the negative electrode 52 including the negative electrode active material layer 52B formed on each of opposite sides of the negative electrode current collector 52A (except the projecting part 52AT) are fabricated, following which the multiple positive electrodes 51 and the multiple negative electrodes 52 are alternately stacked on each other with the multiple separators 53 interposed therebetween to thereby form a stacked body. Thereafter, the multiple projecting parts 51AT are joined to each other by a method such as a welding method to form the joint part 51Z, and the multiple projecting parts 52AT are joined to each other by a method such as a welding method to form the joint part 52Z. Thereafter, the positive electrode lead 54 is coupled to the joint part 51Z by a method such as a welding method, and the negative electrode lead 55 is coupled to the joint part 52Z by a method such as a welding method. Lastly, the electrolytic solution is injected into the pouch-shaped outer package film 20 in which the stacked body is contained, following which the outer package film 20 is sealed. Thus, the stacked body is impregnated with the electrolytic solution. As a result, the stacked electrode body 50 is fabricated.

In a case where the stacked electrode body 50 is used, it is also possible to obtain effects similar to the effects obtained in a case where the wound electrode body 10 is used.

The number of the positive electrode leads 54 and the number of the negative electrode leads 55 in the secondary battery of the laminated-film type illustrated in FIGS. 4 and 5 are each not limited to a particular number. That is, the number of the positive electrode leads 54 is not limited to one and may be two or greater. The number of the negative electrode leads 55 is not limited to one and may be two or greater. Similar effects are obtainable also in the case where the number of the positive electrode leads 54 and the number of the negative electrode leads 55 are changed.

The separator 13 which is a porous film is used in the secondary battery of the laminated-film type illustrated in FIGS. 1 and 2. However, although not specifically illustrated here, a separator of a stacked type which includes a polymer compound layer may be used instead of the separator 13 which is the porous film.

Specifically, the separator of the stacked type includes a base layer which is the porous film described above, and a polymer compound layer provided on one or both sides of the base layer. A reason for this is that adherence of the separator to each of the positive electrode 11 and the negative electrode 12 is improved, which helps to prevent occurrence of a positional displacement of the wound electrode body 10. This helps to prevent swelling of the secondary battery, for example, even when the decomposition reaction of the electrolytic solution occurs. The polymer compound layer includes a polymer compound such as polyvinylidene difluoride. A reason for this is that polyvinylidene difluoride has a high physical strength and is electrochemically stable.

The base layer, the polymer compound layer, or both may include one or more of a plurality of kinds of particles including, without limitation, inorganic particles and resin particles. A reason for this is that the particles dissipate heat when the secondary battery generates heat, thereby improving the thermal resistance and safety of the secondary battery. The inorganic particles are not limited to a particular kind. Examples of the inorganic particles include particles of aluminum oxide (alumina), aluminum nitride, boehmite, silicon oxide (silica), titanium oxide (titania), magnesium oxide (magnesia), and zirconium oxide (zirconia).

In a case of fabricating the separator of the stacked type, a precursor solution including, without limitation, a polymer compound and an organic solvent is prepared, following which the precursor solution is applied on one or both sides of the base layer.

Similar effects are obtainable also in the case where the separator of the stacked type is used, as lithium is movable between the positive electrode 11 and the negative electrode 12.

In the secondary battery of the laminated-film type illustrated in FIGS. 1 and 2, the electrolytic solution, which is a liquid electrolyte, is used. However, although not specifically illustrated here, an electrolyte layer which is a gel electrolyte may be used instead of the electrolytic solution.

In the wound electrode body 10 including the electrolyte layer, the positive electrode 11 and the negative electrode 12 are stacked on each other with the separator 13 and the electrolyte layer interposed therebetween, following which the stack of the positive electrode 11, the negative electrode 12, the separator 13, and the electrolyte layer is wound. The electrolyte layer is interposed between the positive electrode 11 and the separator 13, and between the negative electrode 12 and the separator 13.

Specifically, the electrolyte layer includes a polymer compound together with the electrolytic solution. The electrolytic solution is held by the polymer compound in the electrolyte layer. The configuration of the electrolytic solution is as described above. The polymer compound includes, for example, polyvinylidene difluoride. In a case of forming the electrolyte layer, a precursor solution that includes materials including, without limitation, the electrolytic solution, the polymer compound, and an organic solvent is prepared, following which the precursor solution is applied on each of opposite sides of the positive electrode 11 and each of opposite sides of the negative electrode 12.

Similar effects are obtainable also in the case where the electrolyte layer is used, as lithium is movable between the positive electrode 11 and the negative electrode 12 via the electrolyte layer.

Next, a description is given of applications (application examples) of the above-described secondary battery.

The applications of the secondary battery are not particularly limited as long as they are, for example, machines, equipment, instruments, apparatuses, or systems (an assembly of a plurality of pieces of equipment, for example) in which the secondary battery is usable mainly as a driving power source, an electric power storage source for electric power accumulation, or any other source. The secondary battery used as a power source may serve as a main power source or an auxiliary power source. The main power source is preferentially used regardless of the presence of any other power source. The auxiliary power source may be used in place of the main power source, or may be switched from the main power source on an as-needed basis. In a case where the secondary battery is used as the auxiliary power source, the kind of the main power source is not limited to the secondary battery.

Specific examples of the applications of the secondary battery include: electronic equipment including portable electronic equipment; portable life appliances; apparatuses for data storage; electric power tools; battery packs to be mounted as detachable power sources on, for example, laptop personal computers; medical electronic equipment; electric vehicles; and electric power storage systems. Examples of the electronic equipment include video cameras, digital still cameras, mobile phones, laptop personal computers, cordless phones, headphone stereos, portable radios, portable televisions, and portable information terminals. Examples of the portable life appliances include electric shavers. Examples of the apparatuses for data storage include backup power sources and memory cards. Examples of the electric power tools include electric drills and electric saws. Examples of the medical electronic equipment include pacemakers and hearing aids. Examples of the electric vehicles include electric automobiles including hybrid automobiles. Examples of the electric power storage systems include home battery systems for accumulation of electric power for a situation such as emergency. Note that the secondary battery may have a battery structure of the above-described laminated-film type or any other type. Further, multiple secondary batteries may be used, for example, as a battery pack or a battery module.

In particular, the battery pack and the battery module are each effectively applied to relatively large-sized equipment, etc., including an electric vehicle, an electric power storage system, and an electric power tool. The battery pack, as will be described later, may include a single battery, or may include an assembled battery. The electric vehicle is a vehicle that operates (travels) using the secondary battery as a driving power source, and may be an automobile that is additionally provided with a driving source other than the secondary battery as described above, such as a hybrid automobile. The electric power storage system is a system that uses the secondary battery as an electric power storage source. An electric power storage system for home use accumulates electric power in the secondary battery which is an electric power storage source, and the accumulated electric power may thus be utilized for using, for example, home appliances.

An application example of the secondary battery will now be described in detail. The configuration of the application example described below is merely an example, and is appropriately modifiable.

Figure 6:
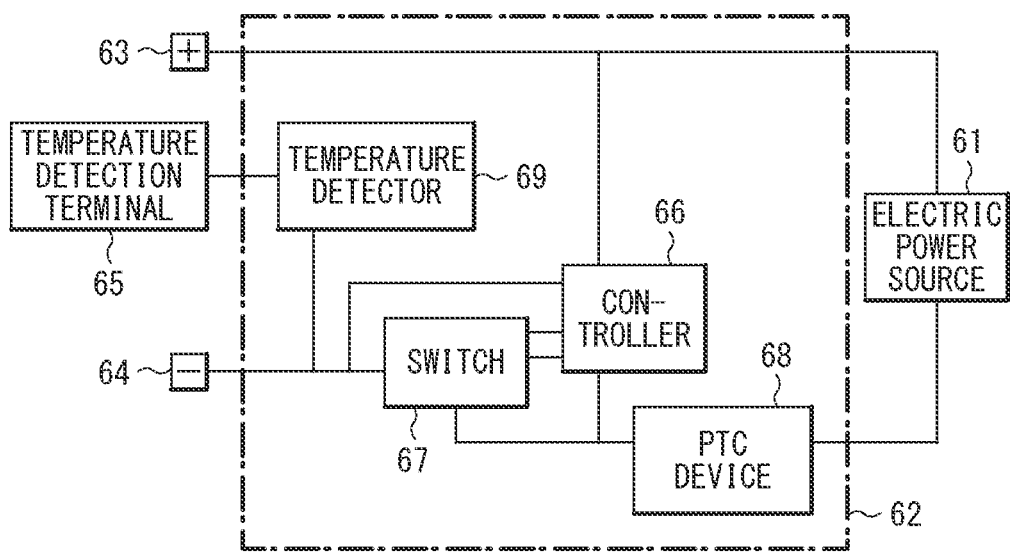
FIG. 6 is a block diagram illustrating a configuration of an application example of the secondary battery, which is a battery pack including a single battery.

FIG. 6 illustrates a block configuration of a battery pack including a single battery. The battery pack described here is a simple battery pack (a so-called soft pack) including one secondary battery, and is to be mounted on, for example, electronic equipment typified by a smartphone.

As illustrated in FIG. 6, the battery pack includes an electric power source 61 and a circuit board 62. The circuit board 62 is coupled to the electric power source 61, and includes a positive electrode terminal 63, a negative electrode terminal 64, and a temperature detection terminal (a so-called T terminal) 65.

The electric power source 61 includes one secondary battery. The secondary battery has a positive electrode lead coupled to the positive electrode terminal 63 and a negative electrode lead coupled to the negative electrode terminal 64. The electric power source 61 is couplable to outside via the positive electrode terminal 63 and the negative electrode terminal 64, and is thus chargeable and dischargeable via the positive electrode terminal 63 and the negative electrode terminal 64. The circuit board 62 includes a controller 66, a switch 67, a positive temperature coefficient device (PTC device) 68, and a temperature detector 69. However, the PTC device 68 may be omitted.

The controller 66 includes, for example, a central processing unit (CPU) and a memory, and controls an overall operation of the battery pack. The controller 66 detects and controls a use state of the electric power source 61 on an as-needed basis.

If a battery voltage of the electric power source 61 (the secondary battery) reaches an overcharge detection voltage or an overdischarge detection voltage, the controller 66 turns off the switch 67. This prevents a charging current from flowing into a current path of the electric power source 61. In addition, if a large current flows upon charging or discharging, the controller 66 turns off the switch 67 to block the charging current. The overcharge detection voltage and the overdischarge detection voltage are not particularly limited. For example, the overcharge detection voltage is 4.2 V±0.05 V and the overdischarge detection voltage is 2.4 V±0.1 V.

The switch 67 includes, for example, a charge control switch, a discharge control switch, a charging diode, and a discharging diode. The switch 67 performs switching between coupling and decoupling between the electric power source 61 and external equipment in accordance with an instruction from the controller 66. The switch 67 includes, for example, a metal-oxide-semiconductor field-effect transistor (MOSFET) including a metal-oxide semiconductor. The charging and discharging currents are detected on the basis of an ON-resistance of the switch 67.

The temperature detector 69 includes a temperature detection device such as a thermistor. The temperature detector 69 measures a temperature of the electric power source 61 using the temperature detection terminal 65, and outputs a result of the temperature measurement to the controller 66. The result of the temperature measurement to be obtained by the temperature detector 69 is used, for example, in a case where the controller 66 performs charge/discharge control upon abnormal heat generation or in a case where the controller 66 performs a correction process upon calculating a remaining capacity.

EXAMPLES

A description is given of Examples of the technology.

Experiment Examples 1-1 to 1-12

Secondary batteries (lithium-ion secondary batteries) of the laminated-film type illustrated in FIGS. 1 and 2 were fabricated, following which the secondary batteries were evaluated for their respective battery characteristics as described below.

[Fabrication of Secondary Battery]

The secondary batteries were fabricated in accordance with the following procedure.

(Fabrication of Positive Electrode)

First, 91 parts by mass of the positive electrode active material ($LiCoO_2$ which is a lithium-containing transition metal compound (an oxide)), 3 parts by mass of the positive electrode binder (polyvinylidene difluoride), and 6 parts by mass of the positive electrode conductor (graphite) were mixed with each other to thereby obtain a positive electrode mixture. Thereafter, the positive electrode mixture was put into NMP, following which NMP was stirred to thereby prepare a paste positive electrode mixture slurry. Thereafter, the positive electrode mixture slurry was applied on each of opposite sides of the positive electrode current collector 11A (a band-shaped aluminum foil having a thickness of 12 μm) by means of a coating apparatus, following which the applied positive electrode mixture slurry was dried to thereby form the positive electrode active material layer 11B. Lastly, the positive electrode active material layer 11B was compression-molded by means of a roll pressing machine. In this manner, the positive electrode active material layer 11B was formed on each of the opposite sides of the positive electrode current collector 11A. Thus, the positive electrode 11 was fabricated.

In a case of fabricating the positive electrode 11, the content of NMP in the positive electrode mixture slurry was changed to change the concentration ratio C, as will be described later.

(Fabrication of Negative Electrode)

First, 93 parts by mass of the negative electrode active material (artificial graphite which is a carbon material) and 7 parts by mass of the negative electrode binder (polyvinylidene difluoride) were mixed with each other to thereby obtain a negative electrode mixture. Thereafter, the negative electrode mixture was put into an organic solvent (NMP), following which the organic solvent was stirred to thereby prepare a paste negative electrode mixture slurry. Thereafter, the negative electrode mixture slurry was applied on each of opposite sides of the negative electrode current collector 12A (a band-shaped copper foil having a thickness of 15 μm) by means of a coating apparatus, following which the applied negative electrode mixture slurry was dried to thereby form the negative electrode active material layer 12B. Lastly, the negative electrode active material layer 12B was compression-molded by means of a roll pressing machine. In this manner, the negative electrode active material layer 12B was formed on each of the opposite sides of the negative electrode current collector 12A. Thus, the negative electrode 12 was fabricated.

(Preparation of Electrolytic Solution)

The electrolyte salt (lithium hexafluorophosphate ($LiPF_6$)) was added to a solvent (ethylene carbonate and diethyl carbonate), following which the solvent was stirred. A mixture ratio (a weight ratio) of the solvent was set as follows: ethylene carbonate/diethyl carbonate=50:50. The content of the electrolyte salt with respect to the solvent was set to 1 mol/kg.
(Assembly of Secondary Battery)

First, the positive electrode lead 14 including aluminum was welded to the positive electrode current collector 11A, and the negative electrode lead 15 including copper was welded to the negative electrode current collector 12A. Thereafter, the positive electrode 11 and the negative electrode 12 were stacked on each other with the separator 13 (a fine-porous polyethylene film having a thickness of 15 µm) interposed therebetween, following which the stack of the positive electrode 11, the negative electrode 12, and the separator 13 was wound to thereby fabricate a wound body.

Thereafter, the outer package film 20 was folded in such a manner as to sandwich the wound body placed in the depression 20U, following which the outer edges of two sides of the outer package film 20 were thermal fusion bonded to each other to thereby allow the wound body to be contained inside the pouch-shaped outer package film 20. As the outer package film 20, an aluminum laminated film was used in which a fusion-bonding layer (a polypropylene film having a thickness of 30 µm), a metal layer (an aluminum foil having a thickness of 40 µm), and a surface protective layer (a nylon film having a thickness of 25 µm) were stacked in this order from the inner side.

Thereafter, the electrolytic solution was injected into the pouch-shaped outer package film 20 and thereafter, the outer edges of the remaining one side of the outer package film 20 were thermal fusion bonded to each other in a reduced-pressure environment. In this case, the sealing film 21 (a polypropylene film having a thickness of 5 µm) was interposed between the outer package film 20 and the positive electrode lead 14, and the sealing film 22 (a polypropylene film having a thickness of 5 µm) was interposed between the outer package film 20 and the negative electrode lead 15. The wound body was thereby impregnated with the electrolytic solution. Thus, the wound electrode body 10 was formed. In this manner, the wound electrode body 10 was sealed in the outer package film 20. As a result, the secondary battery was assembled.

Lastly, the secondary battery was charged and discharged for one cycle in order to stabilize the state of the secondary battery. The environmental temperature and the charging and discharging conditions were similar to those for a case of examining the cyclability characteristic to be described later. The charging and discharging of the secondary battery caused an SEI film to be formed on the surface of, for example, the negative electrode 12. As a result, the secondary battery of the laminated-film type was completed.

After the completion of the secondary battery, the positive electrode active material layer 11B was analyzed by TOF-SIMS, regarding the positive electrode 11 collected from the secondary battery, and the concentration ratio C (the peak intensity ratio T) listed in Table 1 was obtained. Note that the content of NMP (mm³/m²) in the positive electrode active material layer 11B was as listed in Table 1.

[Evaluation of Battery Characteristic]

Evaluation of the secondary batteries for their battery characteristics (the electric resistance characteristic and the cyclability characteristic) revealed the results presented in Table 1.

(Electric Resistance Characteristic)

In a case of examining the electric resistance characteristic, first, the secondary battery was charged in an ambient temperature environment (at a temperature of 23° C.). In this case, the secondary battery was charged with a constant current of 0.5 C until a voltage reached 3.8 V, and was thereafter charged with a constant voltage of 3.8 V until a total charging time reached 2 hours. "0.5 C" refers to a value of a current that causes a battery capacity (theoretical capacity) to be completely discharged in 2 hours. Thereafter, the secondary battery was discharged in the same environment to thereby measure an amount of voltage drop. In this case, the secondary battery was discharged with a current of 0.5 C, and the amount of voltage drop after elapse of one second from the start of discharging was measured. Lastly, direct-current resistance (initial resistance (mΩ)) of the secondary battery was calculated on the basis of the amount of voltage drop.

(Cyclability Characteristic)

In the case of examining the cyclability characteristic, first, the secondary battery was charged and discharged for one cycle in an ambient temperature environment (at a temperature of 23° C.) to thereby measure a discharge capacity (a first-cycle discharge capacity). Thereafter, the secondary battery was repeatedly charged and discharged in the same environment until the number of cycles of charging and discharging reached 500 to thereby measure the discharge capacity (a 500th-cycle discharge capacity). Lastly, the following was calculated: capacity retention rate (%)= (500th-cycle discharge capacity/first-cycle discharge capacity)×100.

Upon charging, the secondary battery was charged with a constant current of 0.1 C until the voltage reached 4.2 V, following which the secondary battery was charged with a constant voltage of 4.2 V until the current reached 0.02 C. Upon discharging, the secondary battery was discharged with a constant current of 0.1 C until the voltage reached 3 V. "0.1 C" refers to a value of a current that causes a battery capacity (theoretical capacity) to be completely discharged in 10 hours, and "0.02 C" refers to a value of a current that causes the battery capacity described above to be completely discharged in 50 hours.

TABLE 1

| Experiment example | Positive electrode (positive electrode active material layer) | | Initial resistance (mΩ) | Capacity retention rate (%) |
| --- | --- | --- | --- | --- |
| | Concentration ratio C | Content (mm³/m²) | | |
| 1-1 | 2 | 75 | 70 | 71 |
| 1-2 | 3 | 75 | 70 | 72 |
| 1-3 | 4 | 75 | 70 | 92 |
| 1-4 | 6 | 75 | 70 | 86 |
| 1-5 | 8 | 75 | 70 | 80 |
| 1-6 | 10 | 75 | 70 | 60 |
| 1-7 | 11 | 75 | 70 | 55 |
| 1-8 | 4 | 35 | 90 | 78 |
| 1-9 | 4 | 65 | 75 | 86 |
| 1-10 | 4 | 100 | 65 | 82 |
| 1-11 | 4 | 125 | 60 | 80 |
| 1-12 | 4 | 150 | 58 | 75 |

As listed in Table 1, the battery characteristic (the electric resistance characteristic and the cyclability characteristic) of the secondary battery varied greatly depending on the concentration ratio C.

Specifically, in a case where the concentration ratio C was from 4 to 8 both inclusive (Experiment examples 1-3 to 1-5), the capacity retention rate increased significantly while the initial resistance was suppressed to be low, as compared with a case where the concentration ratio C was smaller than 4

(Experiment examples 1-1 and 1-2) and a case where the concentration ratio C was larger than 8 (Experiment examples 1-6 and 1-7).

In particular, if the concentration ratio C was from 4 to 6 both inclusive (Experiment examples 1-3 and 1-4), the capacity retention rate further increased. In addition, if the content of NMP in the positive electrode active material layer 11B was from 65 mm$^3$/m$^2$ to 125 mm$^3$/m$^2$ both inclusive (Experiment examples 1-9 to 1-11), a sufficient capacity retention rate was obtained while the initial resistance was sufficiently suppressed, as compared with a case where the content of NMP was smaller than 65 mm$^3$/m$^2$ (Experiment example 1-8) and a case where the content of NMP was larger than 125 mm$^3$/m$^2$ (Experiment example 1-12).

Experiment Examples 2-1 to 2-4

As listed in Table 2, secondary batteries were fabricated and were evaluated for their respective battery characteristics by similar procedures except that the composition of the electrolytic solution was changed. In this case, a nitrile compound including succinonitrile (SN) and adiponitrile (ADN) was added to the electrolytic solution. The content of the nitrile compound (wt %) in the electrolytic solution was as listed in Table 2. Note that a mixture ratio (a weight ratio) between succinonitrile and adiponitrile was set to 4:1.

TABLE 2

| Experiment example | Positive electrode (positive electrode active material layer) | | Nitrile compound | | Initial resistance (mΩ) | Capacity retention rate (%) |
|---|---|---|---|---|---|---|
| | Concentration ratio C | Content (mm$^3$/m$^2$) | Kind | Content (wt %) | | |
| 1-3 | 4 | 75 | — | — | 70 | 92 |
| 2-1 | | | SN + | 2 | 50 | 75 |
| 2-2 | | | AND | 3 | 60 | 82 |
| 2-3 | | | | 8 | 70 | 92 |
| 2-4 | | | | 9 | 85 | 94 |

As listed in Table 2, in a case where the above-described optimized condition (the concentration ratio C of from 4 to 8 both inclusive) was satisfied regarding the concentration ratio C, the initial resistance and the capacity retention rate each changed depending on the presence or absence of the nitrile compound in the electrolytic solution.

Specifically, in a case where the electrolytic solution included the nitrile compound (Experiment examples 2-1 to 2-4), the initial resistance further decreased or the capacity retention rate further increased, as compared with a case where the electrolytic solution did not include the nitrile compound (Experiment example 1-3). In this case, if the content of the nitrile compound in the electrolytic solution was from 3 wt % to 8 wt % both inclusive, a sufficiently high capacity retention rate was obtained while the initial resistance sufficiently decreased.

The results presented in Table 1 and Table 2 indicate that, if the positive electrode active material layer 11B of the positive electrode 11 included NMP and the concentration ratio C was from 4 to 8 both inclusive, the electric resistance characteristic was improved and the cyclability characteristic was improved. Accordingly, the secondary battery achieved a superior electric resistance characteristic and a superior cyclability characteristic.

Although the technology has been described above with reference to some embodiments and examples, configurations of the technology are not limited to those described with reference to the embodiments and examples above, and are therefore modifiable in a variety of ways.

Specifically, although the description has been given of the case where the liquid electrolyte (electrolytic solution) and the gel electrolyte (electrolyte layer) are used, the electrolyte is not limited to a particular kind. Alternatively, an electrolyte in a solid state (solid electrolyte) may be used.

Further, although the description has been given of the case where the secondary battery has a battery structure of the laminated-film type, the battery structure is not particularly limited. Alternatively, the battery structure of the secondary battery may be of any other type, such as a cylindrical type, a prismatic type, a coin type, or a button type.

Moreover, although the description has been given of the case where the device structure of the battery device is of the wound type or the stacked type, the device structure of the battery device is not limited to a particular structure. Alternatively, the battery device may have other structures including, without limitation, those of a zigzag folded type in which the electrodes (the positive electrode and the negative electrode) are folded in a zigzag manner.

Further, although the description has been given of the case where the electrode reactant is lithium, the electrode reactant is not limited to a particular element. Specifically, the electrode reactant may be another alkali metal such as sodium or potassium, or may be an alkaline earth metal such as beryllium, magnesium, or calcium, as described above. Alternatively, the electrode reactant may be another light metal such as aluminum.

The effects described herein are mere examples. Therefore, the effects of the technology are not limited to the effects described herein. Accordingly, the technology may achieve any other suitable effect.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A secondary battery comprising:
    a positive electrode including a positive electrode active material layer and extending in a longitudinal direction, the positive electrode active material layer including N-methyl-2-pyrrolidone;
    a negative electrode extending in the longitudinal direction; and
    an electrolytic solution, wherein,
    where the positive electrode active material layer is divided equally in a width direction into two end regions and two middle regions located between the two end regions, a ratio of a content of N-methyl-2-pyrrolidone in the two middle regions to a content of N-methyl-2-pyrrolidone in the two end regions is greater than or equal to 4 and less than or equal to 8,
    wherein the electrolytic solution comprises a solvent and an electrolyte salt, and
    wherein the solvent includes a carbonate.

2. The secondary battery according to claim 1, wherein the ratio of the content of N-methyl-2-pyrrolidone in the two middle regions to the content of N-methyl-2-pyrrolidone in the two end regions is greater than or equal to 4 and less than or equal to 6.

3. The secondary battery according to claim 1, wherein a content of N-methyl-2-pyrrolidone in the positive electrode active material layer is greater than or equal to 65 $mm^3/m^2$ and less than or equal to 125 $mm^3/m^2$.

4. The secondary battery according to claim 1, wherein the electrolytic solution includes a nitrile compound, and the nitrile compound includes at least one of acetonitrile, acrylonitrile, malononitrile, succinonitrile, glutaronitrile, adiponitrile, sebaconitrile, or phthalonitrile.

5. The secondary battery according to claim 4, wherein the nitrile compound includes succinonitrile and adiponitrile.

6. The secondary battery according to claim 4, wherein a content of the nitrile compound in the electrolytic solution is greater than or equal to 3 weight percent and less than or equal to 8 weight percent.

7. The secondary battery according to claim 1, wherein the secondary battery comprises a lithium-ion secondary battery.

8. A positive electrode for a secondary battery, the positive electrode comprising a positive electrode active material layer, the positive electrode active material layer including N-methyl-2-pyrrolidone, wherein,
where the positive electrode active material layer is divided equally in a width direction into two end regions and two middle regions located between the two end regions, a ratio of a content of N-methyl-2-pyrrolidone in the two middle regions to a content of N-methyl-2-pyrrolidone in the two end regions is greater than or equal to 4 and less than or equal to 8.

9. The secondary battery according to claim 1 comprising a separator, wherein the separator includes an insulating porous film.

10. The secondary battery according to claim 9, wherein the insulating porous film includes one or more polymer compounds, wherein the polymer compounds includes one or more of polytetrafluoroethylene, polypropylene and polyethylene.

11. The secondary battery according to claim 1, wherein the carbonate comprises a carbonic-acid-ester-based compound, a carboxylic-acid-ester-based compound or a lactone-based compound.

12. The secondary battery according to claim 1, wherein the electrolyte salt comprises a lithium salt.

* * * * *